United States Patent [19]

Meyers

[11] Patent Number: 5,751,492
[45] Date of Patent: May 12, 1998

[54] DIFFRACTIVE/REFRACTIVE LENSLET ARRAY INCORPORATING A SECOND ASPHERIC SURFACE

[75] Inventor: Mark Marshall Meyers, Hamlin, N.Y.

[73] Assignee: Eastman Kodak Company, Rochester, N.Y.

[21] Appl. No.: 663,887

[22] Filed: Jun. 14, 1996

[51] Int. Cl.[6] .................................................. G02B 24/10
[52] U.S. Cl. ........................................... 359/619; 359/626
[58] Field of Search ................................ 359/619, 621, 359/622, 623, 626, 625

[56] References Cited

U.S. PATENT DOCUMENTS

| | | | |
|---|---|---|---|
| 3,765,741 | 10/1973 | Kimura | 359/22 |
| 3,910,683 | 10/1975 | Nishino et al. | 350/162 |
| 4,009,939 | 3/1977 | Okano | 350/162 |
| 4,083,627 | 4/1978 | Okano | 350/162 |
| 4,093,346 | 6/1978 | Nishino et al. | 350/162 |
| 4,318,123 | 3/1982 | Knop | 358/43 |
| 4,323,925 | 4/1982 | Abell et al. | 358/213 |
| 4,377,753 | 3/1983 | Mir | 250/578 |
| 4,689,291 | 8/1987 | Popovic et al. | 430/321 |
| 4,708,436 | 11/1987 | Kleinknecht | 350/162.17 |
| 4,733,096 | 3/1988 | Horiguchi | 250/578 |
| 4,795,236 | 1/1989 | Ise | 350/162.2 |
| 4,878,737 | 11/1989 | Ise | 350/167 |
| 4,905,037 | 2/1990 | Yamamoto | 355/27 |
| 4,989,959 | 2/1991 | Plummer | 350/447 |
| 4,989,985 | 2/1991 | Hubble | 356/445 |
| 4,994,664 | 2/1991 | Veldkamp | 250/216 |
| 4,998,800 | 3/1991 | Nishida et al. | 350/162.2 |
| 5,004,901 | 4/1991 | Yoshimoto et al. | 250/201.5 |
| 5,029,010 | 7/1991 | Shiraishi | 358/225 |
| 5,046,827 | 9/1991 | Frost et al. | 359/54 |
| 5,076,687 | 12/1991 | Adelson | 356/4 |
| 5,121,213 | 6/1992 | Nishioka | 358/213.11 |
| 5,151,790 | 9/1992 | Takatori et al. | 358/225 |
| 5,187,358 | 2/1993 | Setani | 250/208.1 |
| 5,233,174 | 8/1993 | Zmek | 250/201.9 |
| 5,233,431 | 8/1993 | Yoshida et al. | 358/227 |
| 5,280,388 | 1/1994 | Okayama et al. | 359/569 |
| 5,294,993 | 3/1994 | Sable | 358/350 |
| 5,309,239 | 5/1994 | Bouwhuis | 348/265 |
| 5,322,998 | 6/1994 | Jackson | 250/216 |
| 5,340,978 | 8/1994 | Rostoker et al. | 250/208.1 |
| 5,349,471 | 9/1994 | Morris et al. | 359/565 |
| 5,471,515 | 11/1995 | Fossum et al. | 377/60 |
| 5,497,269 | 3/1996 | Gal | 359/615 |
| 5,504,621 | 4/1996 | Okayama et al. | 359/569 |
| 5,529,936 | 6/1996 | Rostoker | 437/2 |

FOREIGN PATENT DOCUMENTS 8-107194  10/1994  Japan ................ H01L 27/14

OTHER PUBLICATIONS

Toshio Honda, International Conference on Applications of Optical Holography, SPIE—The International Society for Optical Engineering, vol. 2577, Jun. 5, 1995.

"Visible Array Detectors" by Timothy J. Tredwell, from Handbook of Optics, vol. 1, Fundamentals, Techniques, & Design, Second Edition, Chapter 22, pp. 32–34.

Primary Examiner—David C. Nelms
Assistant Examiner—Ricky Mack
Attorney, Agent, or Firm—Edward Dugas

[57] ABSTRACT

A short focal length image sensor comprising:

a color photosensor array comprised of sets of three photosensors with red, green, and blue, filters positioned over respective photosensors in each set;

a lenslet array corresponding in the number of lenslets to the number of sets of photosensors in said color photosensor array, wherein each lenslet is formed with a first convex, spherical surface having diffractive means incorporated thereon and a second surface which is aspheric, substantially opposite said first surface with the size of said lenslet array being greater than the size of said photosensor array by an amount that allows the local optical axis of each lenslet at the largest field angle to image incident light onto the set of photosensors associated with the image sensors largest field angle; and an array of aperture stops combined with an array of field stops wherein the number of field and aperture stops corresponds to the number of lenslets and wherein each field and aperture stop is aligned to the center of the local optical axis for an associated set of photosensors.

7 Claims, 9 Drawing Sheets

DIFFRACTIVE/REFRACTIVE LENSLET ARRAY INCORPORATING A SECOND ASPHERIC SURFACE

FIELD OF THE INVENTION

This invention is related to the field of lenslet arrays for image sensors and particularly to the field of lenslet arrays which when combined with digital image sensors form an electronic representation of the optical intensity distribution at the focal plane of the lenslet array.

BACKGROUND OF THE INVENTION

The minimum thickness of a camera is limited by the back focal distance of the camera objective. Focusing on digital cameras, it is possible to make digital cameras thinner by using wide angle lenses, but this makes objects appear as a smaller fraction of the field of view than is desired in some instances. There is also a limitation of the lens ½ field angle to be less than 30 to 35 degrees below which it is much easier to correct for field dependent aberrations such as coma, astigmation, lateral color, petzval field curvature and lateral color. This field angle limitation limits how short the focal length of the objective can be and in turn how thin a camera can be. It is the object of the current invention to form a very thin camera using a novel type of array lens photographic objective.

Lenslets arrays have been used to concentrate light imaged on the detector plane by a photographic objective into smaller areas to allow more of the incident light to fall on the photosensitive area of the photodetector array and less on to insensitive area between the pixels. This has been described in papers such as "Visible Array Detectors" by Timothy J. Tredwell, from HANDBOOK OF OPTICS, VOL. 1, FUNDAMENTALS, TECHNIQUES, & DESIGN, SECOND EDITION, Chapter 22, pp. 32–34. These lenslet arrays are centered directly above the corresponding photosensor and are not designed to look at different portions of the field of view independently. Rather, they concentrate the light from an existing image formed by the photographic objective into the pixel aperture.

In U.S. Pat. No. 4,994,664, entitled, "Optically Coupled Focal Plane Arrays Using Lenslets And Multiplexers" by Veldkamp, an array of diffractive lenslets is used to concentrate incident light onto an array of photosensors in order to allow for location of amplifying circuitry in areas between photosensor sites. These lenslets are centered over the photosensitive sites and are formed on the opposite side of the photosensor array on a silicon substrate, the use of the silicon substrate prevents them from imaging visible light onto the photosensors since silicon does not transmit in the visible wavelengths. This invention also would not be able to work over the visible wavelength range since the element is composed of all diffractive optical power and suffers from severe chromatic aberrations.

In U.S. Pat. No. 5,233,174, entitled, "Wavefront Sensor Having A Lenslet Array As A Null Corrector" by Zmek, an array of diffractive lenslets with decenters which are adjusted to eliminate the local monochromatic wavefront tilt from a specific optic under test in an interferometric or Hartman type test. A Hartman test is used to certify the surface quality of various optics. If the optics under test falls within the acceptance criteria the wavefront incident on the sensor array will form centered light spots on predetermined pixels. If the wavefront is other than the desired wavefront the light spots will be incident on different pixel elements. This invention is not applicable to the current application since the centered lenslets are not looking at regularly spaced sections of a predetermined field of view. It is also not applicable to white light applications due to the chromatic aberrations of the diffractive lenslets.

U.S. Pat. No. 5,340,978, entitled, "Image-Sensing Display With LCD Display Panel And Photosensitive Element Array" Rostoker et al., briefly describes an array of decentered lenses which form an image of a segment of the field of view is described. These lenses are widely separated and do not include a workable method for limiting a field of view seen by an individual pixel. Light from outside the desired field of view can be incident on the photosensor by scattering off the walls of a spacer element or by reflection and reimaging of light within the array substrate. The wide separation of the lenslets in the array limits the amount of light which can be gathered and focused on the image sensor. The use of the widely separated pixels will greatly increase costs of the sensor since there will be fewer sensor arrays fabricated on a given size substrate or wafer. In addition, the larger sensor array size will cause a decreased yield of finished sensor arrays for a given manufacturing process. Also there is no discussion of the trade-off between the focal length of the lens array and the angular subtense of the pixels field of view. If the focal length of the lenslets is to short light from one part of the field of view which is incident on one pixel will also be within the field of view of an adjacent pixel. For very short focal lengths the corresponding pixel dimension required for an equivalent angular resolution will be so small as to not be able to be fabricated with lithographic processes. In addition, the light gathering area of the pixel will be so small as to not generate a reliably measurable number of electrons for a given incident intensity. There is no discussion of the use of diffractive/refractive hybrids for achromatization. In the current invention the lenses will be abutted to each other and an opaque baffle placed over the sensor to limit the field of view of each pixel.

SUMMARY OF THE INVENTION

The present invention is directed to overcoming one or more of the problems set forth above. Briefly summarized, according to one aspect of the present invention, there is provided an image sensor comprising:

- a color photosensor array comprised of a number of sets of three photosensors with red, green, and blue filters positioned over respective photosensors in each set;
- a lenslet array having a number of lenslets equal to the number of three sets of photosensors in said color photosensor array, wherein each lenslet is formed with a first convex, spherical surface having diffractive means incorporated thereon and a second surface which is aspheric and opposite said first surface with the size of said lenslet array being greater than the size of said color photosensor array by an amount that allows the mechanical optical axis of each lenslet, at the largest field angle, to image incident light onto a set of three photosensors; and
- an array of aperture stops combined with an array of field stops wherein the number of field stops and the number of aperture stops are equal to the number of lenslets and wherein each field and aperture stop is aligned to the center of the mechanical optical axis of a lenslet.

From the aforementioned it can be seen that it is a preferred object of the present invention to provide a lenslet array for an image sensor with a wide field of view and a short back focal distance.

It is another object of the present invention to provide an improved lenslet array for use in a compact semiconductor image sensor assembly that is easy to fabricate and that enables the design and manufacture of cameras thinner than heretofore possible.

These and other aspects, objects, features, and advantages of the present invention will be more clearly understood and appreciated from a review of the following detailed description of the preferred embodiments and appended claims, and by reference to the accompanying drawings.

ADVANTAGEOUS EFFECT OF THE INVENTION

The present invention has the following advantages:

The present lenslet array sensor is compact and portable due to its reduced lens backfocus which permits its use in very thin camera bodies;

sensors incorporating the lenslet array of the present invention are easy to fabricate with minimum critical alignments of parts in that multiple integrated sensor arrays on a semiconductor wafer may be simultaneously aligned with multiple lenslet arrays before dicing of the wafer.

BRIEF DESCRIPTION OF THE DRAWINGS

To facilitate understanding, identical reference numerals have been used, where possible, to designate identical elements that are common to the figures.

DETAILED DESCRIPTION OF THE INVENTION

Figure 1A:
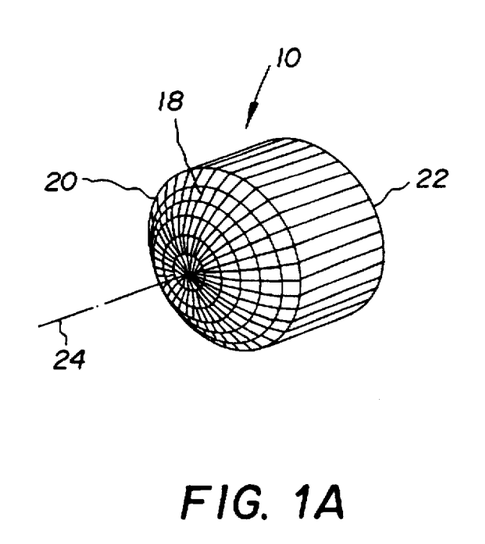
FIGS. 1A and 1B are a front and a rear perspective view of a lenslet formed in accord with the teachings of the present invention.
Figure 1B:
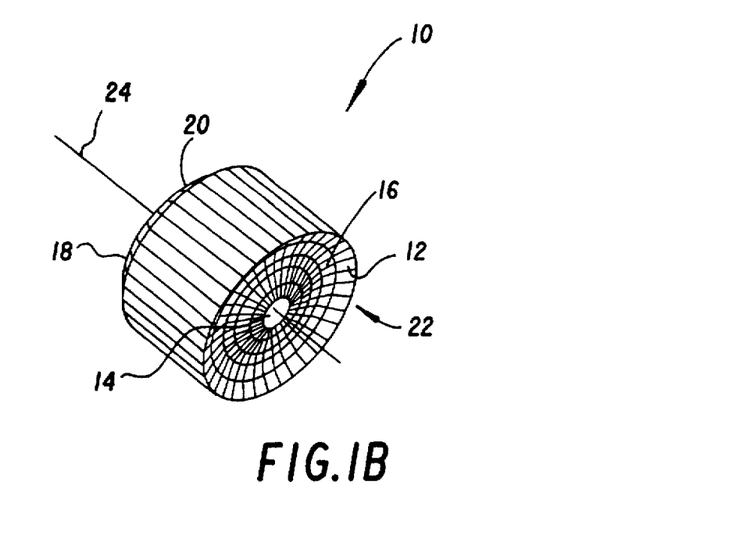

Referring to FIGS. 1A and 1B. The lenslet 10 is one element of a lenslet array that is formed with a number of lenslets. Each lenslet 10 is formed with a diffractive surface 18 formed on a refractive, spherical surface 20. Opposite the diffractive surface 18 is a second surface 22 that is an aspheric surface. The faceted surface of the diffractive surface 18 is seen more clearly in the cross-section of FIG. 2. At a radius 14 the second surface is convex and transforms to a concave surface at the radius 12. The second surface 22 defines a polynomial asphere which exhibits an inflection at the radius 16. Both the first and the second surfaces are substantially perpendicular to the optical axis 24 of the lenslet 10. The lenslet 10 may be formed of optical glass such as BK7, quartz, injection molded plastic, or an epoxy replica.

Figure 2:
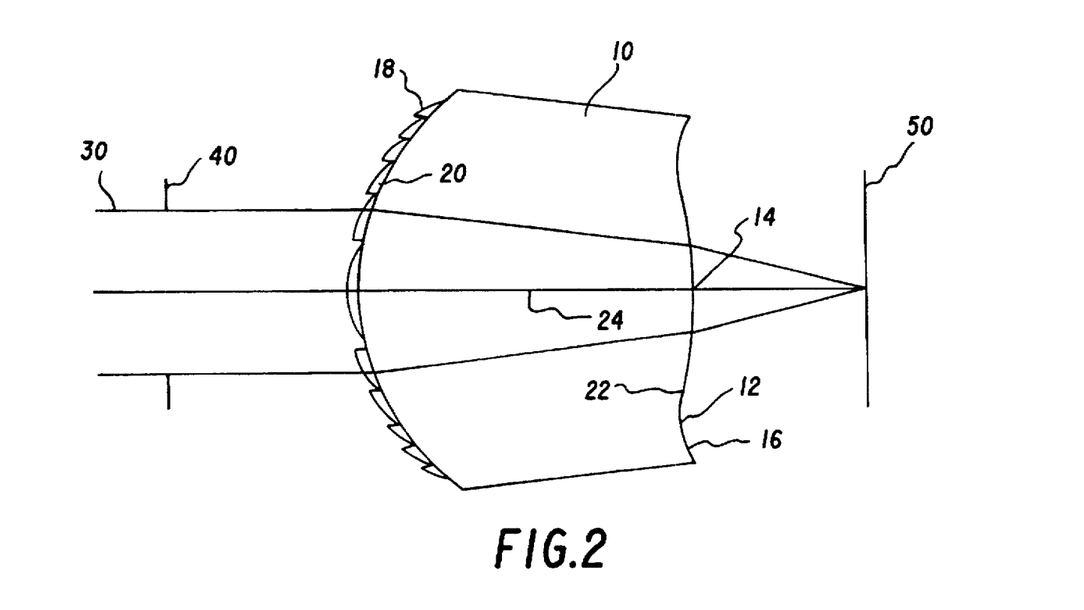
FIG. 2 is a sectioned view taken along the section lines A—A of the lenslet of FIG. 1B.

Referring to FIG. 2, incident light rays 30 pass through an aperture stop array 40 and are focused onto a focal plane 50 by the lenslet 10. The diffractive/refractive surface comprised of 18 and 20 correct the chromatic aberrations and provide the majority of the focusing power while the aspheric surface 22 provides for correction of field dependent aberrations such as petzval curvature, astigmatism, and coma. The lens has an F# of 2.0 and a FL of 0.5 mm, but generally could be from 0.4 to 2.0 mm FL.

Figure 3A:
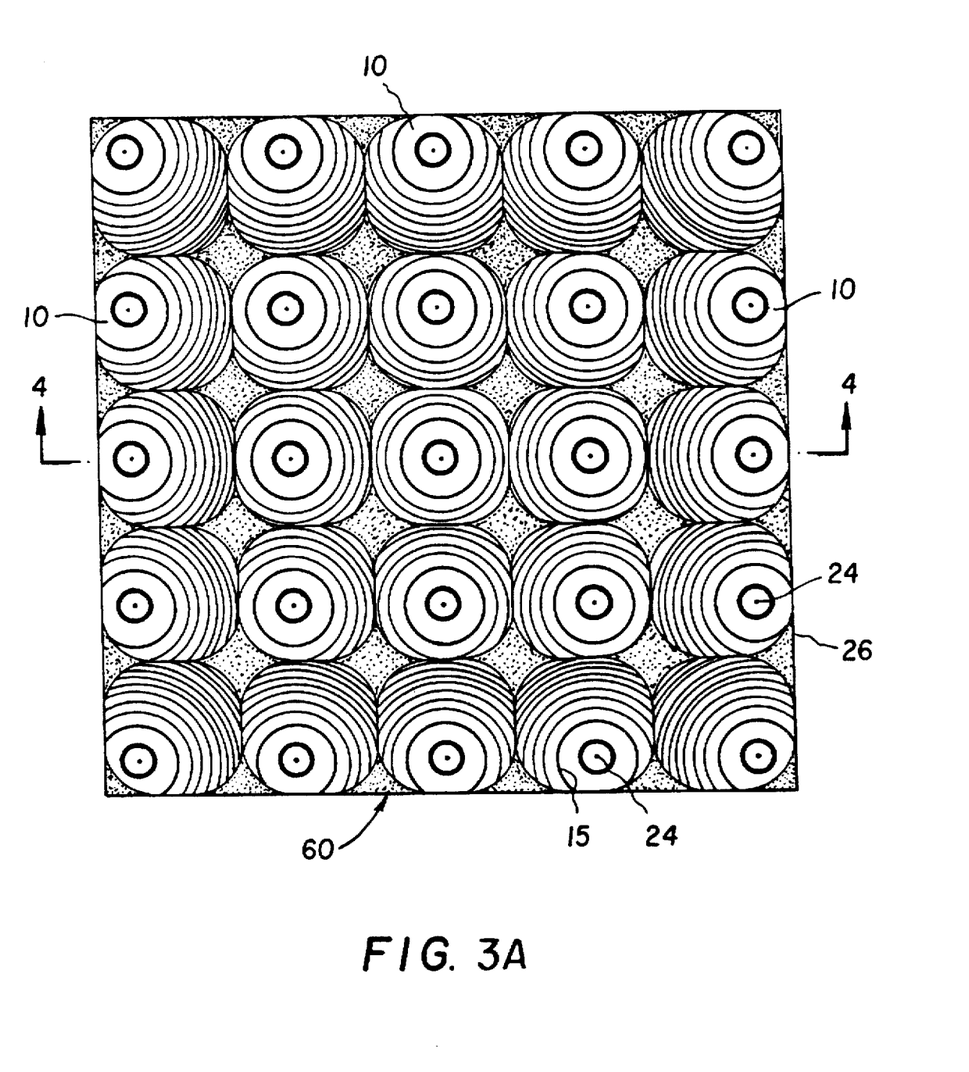
FIGS. 3A and 3B illustrates an aperture array positioned over a lenslet array with the spherical surface of each lenslet defined with topographical lines with the lenslets physical centers diverging with respect to photosensor centers in 3A and converging with respect to the photosensor centers in 3B.
Figure 3B:
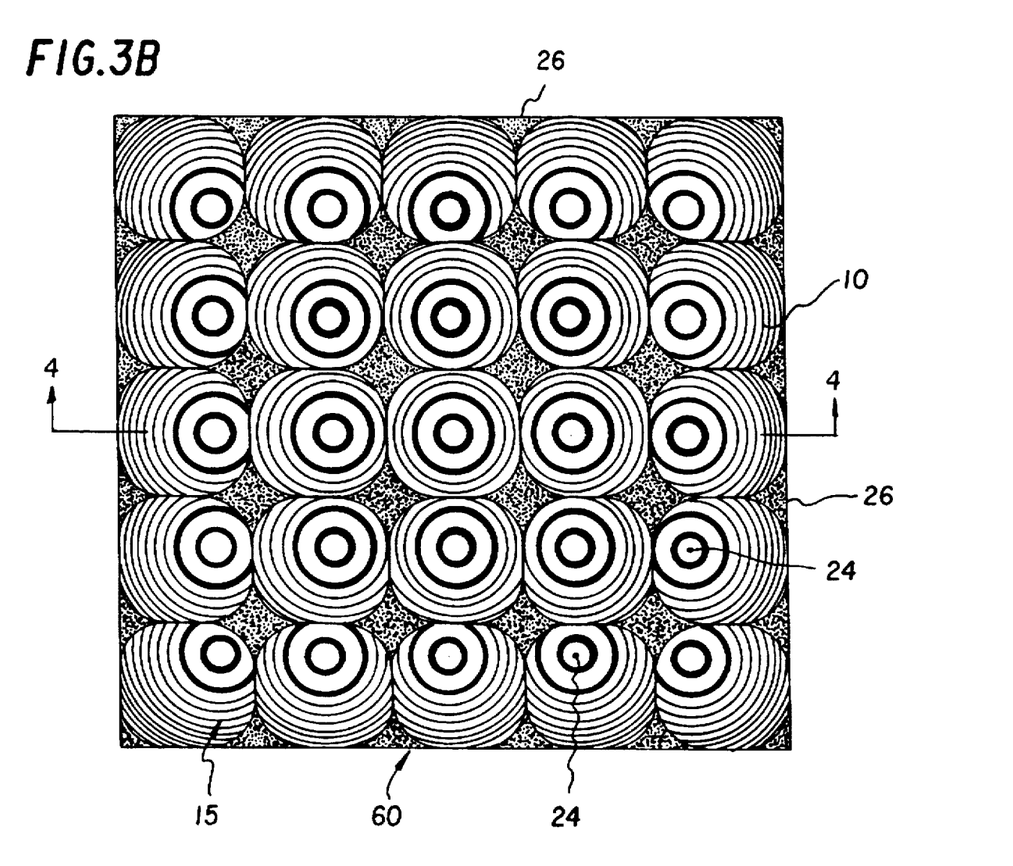

Referring now to FIGS. 3A and 3B. The individual lenslets 10 of FIGS. 1 and 2 are segmented and formed into a lenslet array 60. The lenslet array 60 is formed with the lenslets 10 being associated with corresponding photosensor sites 72 (shown more clearly in FIG. 4). To be observed in FIGS. 3A and 3B is that the mechanical center of the optical axis 24 of each lenslet 10 is displaced outward as a function of its radial distance from the optical axis of the central lenslet while in FIG. 3B, the optical axes are displaced inward. The lines 15 appearing around the optical axis 24 of each lenslet 10 are topographical lines generally indicating changes in height of the lenslet's surface. An array of aperture stops 26 fills the areas between the lenslets 10 to prevent light from reaching the sensor that will be discussed with respect to FIG. 4. The array depicted in FIGS. 3A and 3B represent only a small portion of an array that would be used in an actual camera. In an actual implementation approximately 260×214 to 1500×1000 lenslets are used to form the array 60. This invention does not form the lenslet array with the optical axis of each lenslet, and in turn the lenslet itself, aligned directly over a respective photosite in the CCD device. Instead the lenslets are displaced so as to form the image on a regularly spaced array of photosensors Other configurations of the lenslets may be used such as forming the outer periphery of each lenslet as a square, hexagon, or circle, without detracting from the invention.

The reason that the invention uses only portions of the lenslets is that only a fraction of the lenslet is used for a particular angular field of view for an associated pixel of the group of three pixels for the color application.

Figure 4:
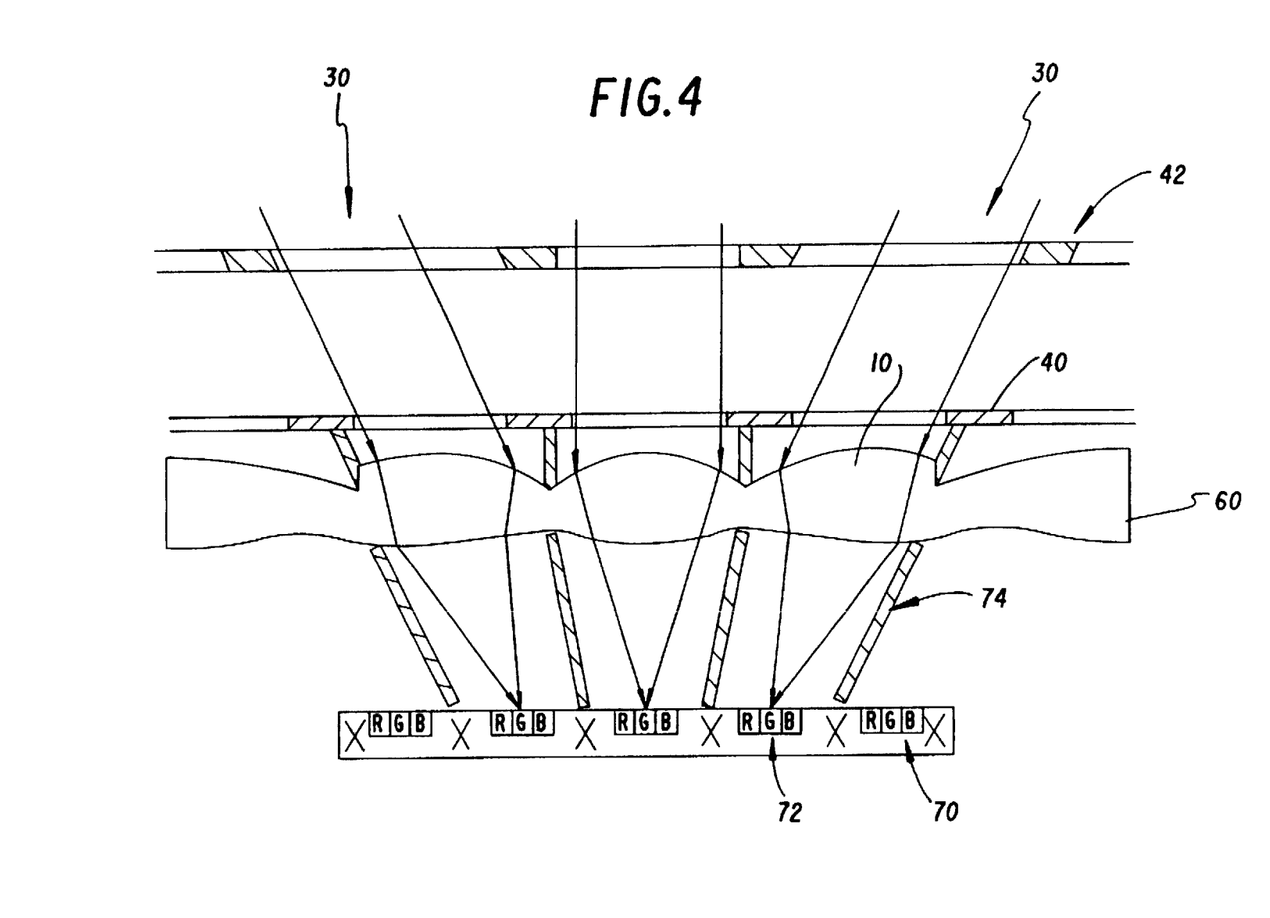
FIG. 4 illustrates, in a cross section view, an image sensor in accordance with the teachings of the present invention having an array of field stops and an array of aperture stops positioned in front of a lenslet array and photosensor array.
Figure 5:
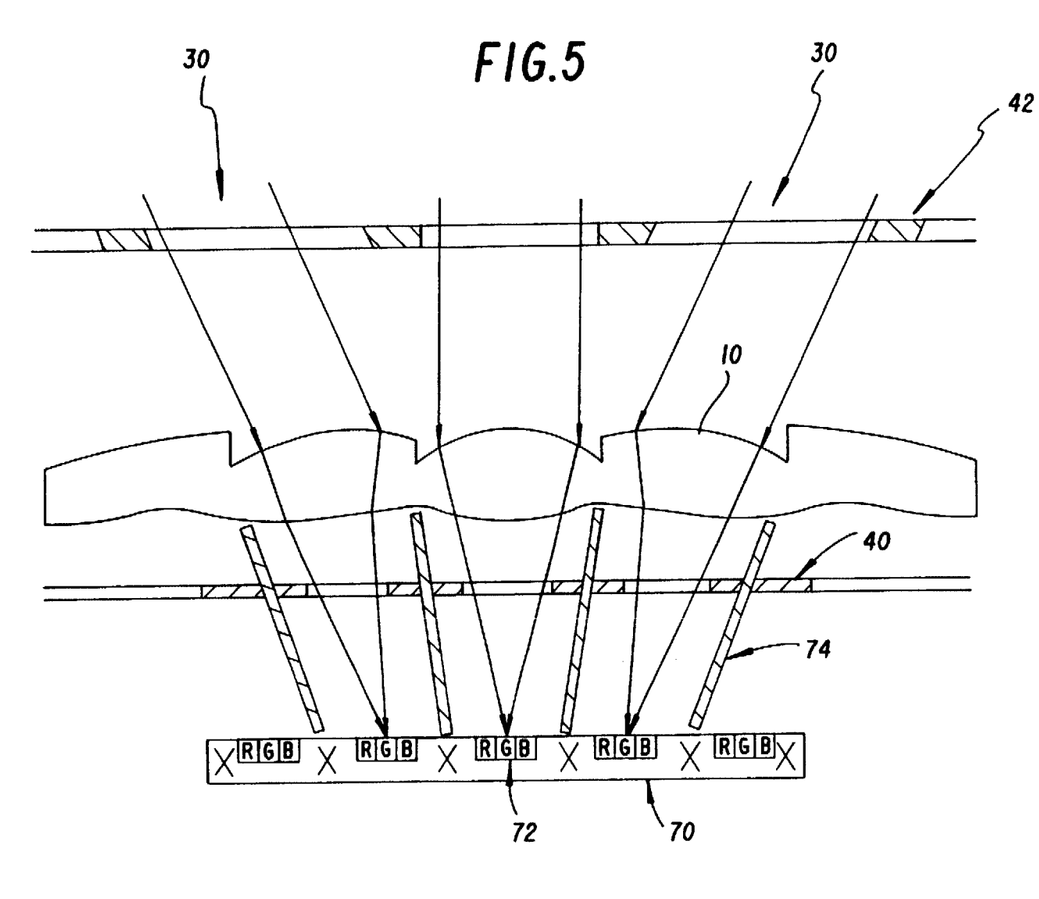
FIG. 5 illustrates, in a cross section view, an image sensor in accordance with the teachings of the present invention having an array of field stops positioned in front of a lenslet array and photosensor array and an array of aperture stops positioned between the lenslet array and the photosensor array.

FIG. 4 is a cross-section taken along the section line 4—4 in FIGS. 3A and 3B, illustrating the lenslet array 60 positioned over an image photosensor array 70 that may be a CCD array having a number of photosensitive sites 72 corresponding in number to at least the number of lenslets forming the array 60. In a three color environment up to three photosensitive sites would be formed under each corresponding lenslet. The lenslet array 60 is maintained a distance apart from the surfaces of the photosensors by spacers 74 that may also serve the function of being baffles. The aperture stop array 40 in combination with the baffles 74 and the field stop array 42 limit the field of view of any particular photosensor so that it does not overlap the field of view of it neighbors by a large amount. The field stop array 42 is positioned approximately 0.5 mm to 2 mm from the surface of the lenslet array 60.

The center of the apertures in the aperture stop array and field stop array, 40 and 42, respectively are aligned to the center of the field of view of a corresponding lenslet. The spacing of the centers increases as a function of each lenslet's field angle from the center of the array causing the aperture stop array to be slightly larger than the associated lenslet array. The combination of the aperture stop array 40 with the field stop array 42 and a given lenslet focal length determines the field of view for a photosensitive site 72.

The lenslet array 60 can be formed of etched quartz, or an epoxy replica on a glass substrate.

The lenslets 10, combined with the appropriate field and aperture stop form images of a small segment of the field of view on photosensitive site 72. The light incident on a lenslet 10 is concentrated onto the active pixel area.

The lenslet positions are adjusted to allow light imaged by the lenslet from a given field of view to be incident onto a given pixel. Since each CCD pixel has its own lens element there is no need to reinvert the image with a relay lens. Therefore, any camera system incorporating the present invention can be extremely compact and flat. The camera can work in black and white or in color if three pixels with color filters are formed on each pixel are used.

An array of aspheric lenslets can be used to form images on the detector array. However, the aforementioned embodiment does not correct for the variation in focal length as a function of wavelength since the lens element is formed from a single refractive material therefore the spot size of the incident light varies as a function of color. An improved optical design including a diffractive/refractive hybrid lens is used to correct the chromatic aberration in a single material.

The imaging properties of diffractive and holographic optics are strongly wavelength dependent. When modeling a diffractive optic this phenomena can be represented as a direct dependence of equivalent refractive index on wavelength:

$$n(\lambda) = [\lambda_c/\lambda](n_c - 1) + 1$$

Diffractive elements impart all of their wavefront bending in an extremely thin layer. This is accounted for in the Sweat model by modeling the diffractive as a very high index material ($n_c = 10,000$) with very low curvatures (weak surfaces) on each surface. The corresponding focal length can then be determined from:

$$f(\lambda) = [n(\lambda) - 1]\Delta c$$

so that $$f(\lambda) = (\lambda_c/\lambda)f_c$$

where $\lambda_c$ = design center wavelength
The resultant dispersion $v_{diff}$ of the diffractive element is:

$$v_{diff} = \frac{n(\lambda_c) - 1}{n(\lambda_S) - n(\lambda_L)}$$

which reduces to:

$$v_{diff} = \frac{\lambda_c}{\lambda_S - \lambda_L}$$

For designs using:
$\lambda_c = 587$ nm $\lambda_S = 486$ nm $v_d = -3.5$
$v_L = 656$ nm For other wavelength bands of interest an appropriate $n_{diff}$ and element power distribution can be calculated. The direct dependence of the equivalent refractive index on wavelength leads to a small, negative, $n_{diff}$ and a high level of wavelength dispersion associated with a first order (m=1) diffractive optical element.

Due to the variation of refractive index with wavelength a single element lens has a variation of focal length with wavelength. Two materials with different dispersions can be used to form a doublet lens which has the same focal length at two wavelengths and reduced variation over the whole spectrum. The relative distribution of focal powers required to achieve this is given by $$\phi_{ref} = \frac{v_{ref} * \phi_{total}}{v_{ref} - v_{diff}}$$

$$\phi_{diff} = \frac{v_{diff} * \phi_{total}}{v_{diff} - v_{ref}}$$

The negative $n_{diff}$ of the diffractive surface allows for achromatization of single element hybrid refractive/diffractive lenses utilizing a positive focal length diffractive and refractive component. It also decreases the focal length and F/# required of the doublet component lenses because a refractive doublet consists of a positive crown (low dispersion) lens with a shorter focal length and smaller F/# than is required for a single element lens and a negative flint element which increases the doublet focal length to the correct value and compensates for the dispersion of the positive lens. This effect also decreases the size and weight of the positive element of a hybrid refractive/diffractive element.

For traditional achromatization in the visible regime (d-e-f lines) with PMMA plastic lenses the fraction of power in the refractive and diffractive portions would be $$\phi_{ref}/\phi_{total} = 94.25\%$$

$$\phi_{diff}/\phi_{total} = 5.75\%$$

It is obvious to a person skilled in the art that one can utilize substrates such a quartz, or optical glass such as BK7, or utilize epoxy replicas on glass substrates.

The use of diffractive/refractive hybrid achromatization enables the use of diffractive surfaces with longer focal lengths and higher F/#'s. The high F/# makes the diffractive element easier to manufacture due to the large zone spacings. For instance for a lens with a FL=0.5 mm and a F/#=2.0 the first order analysis of the refractive and diffractive portions would provide focal lengths and F/#'s of $f_{ref} = 0.531$ mm F/#=2.12

$f_{diff} = 8.696$ mm F/#=34.8

Assuming the diffractive portion of the lenslet was used purely for first order chromatic correction.

Figure 6A:
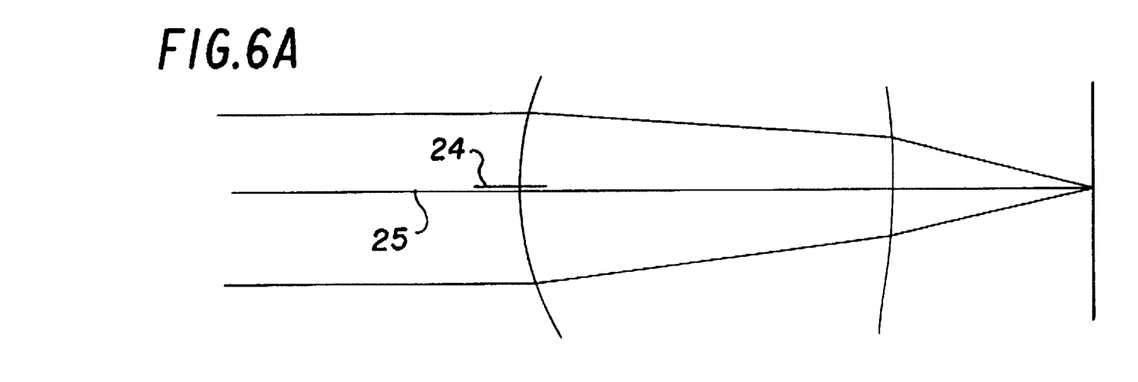
FIGS. 6A, 6B, and 6C, illustrate a cross section of, the portion of a lenslet associated with a 0 degree field angle, the associated tangential, and saggital ray aberration curves, respectively.
Figure 7A:
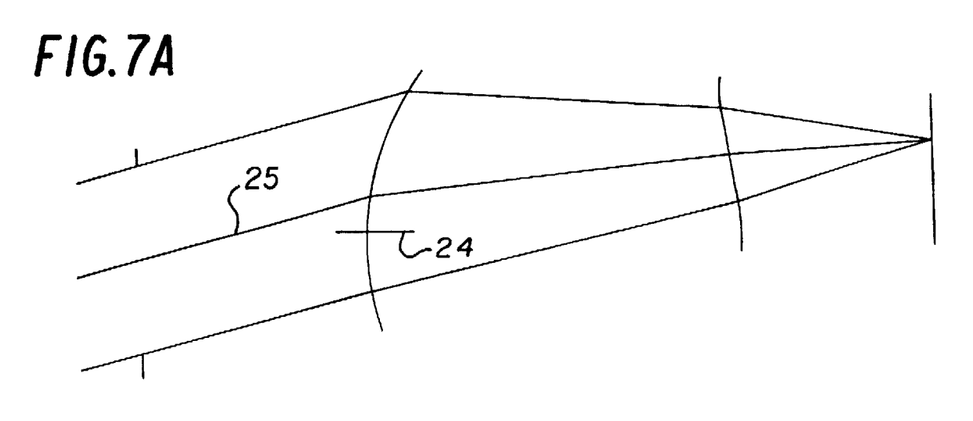
FIGS. 7A, 7B, and 7C, illustrate a cross section of, the portion of a lenslet associated with a 14 degree field angle, the associated tangential, and saggital ray aberration curves, respectively.
Figure 7B:
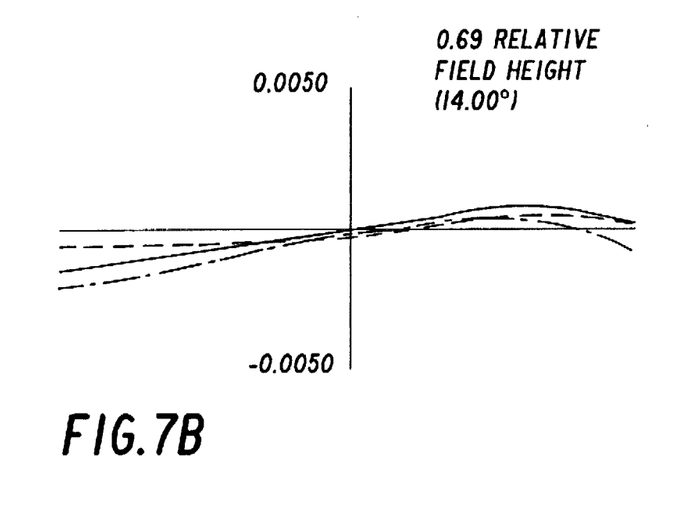
Figure 7C:
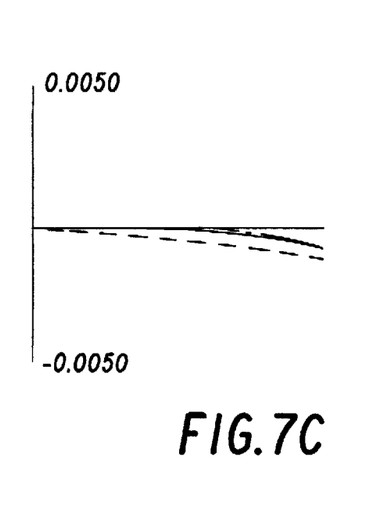
Figure 8A:
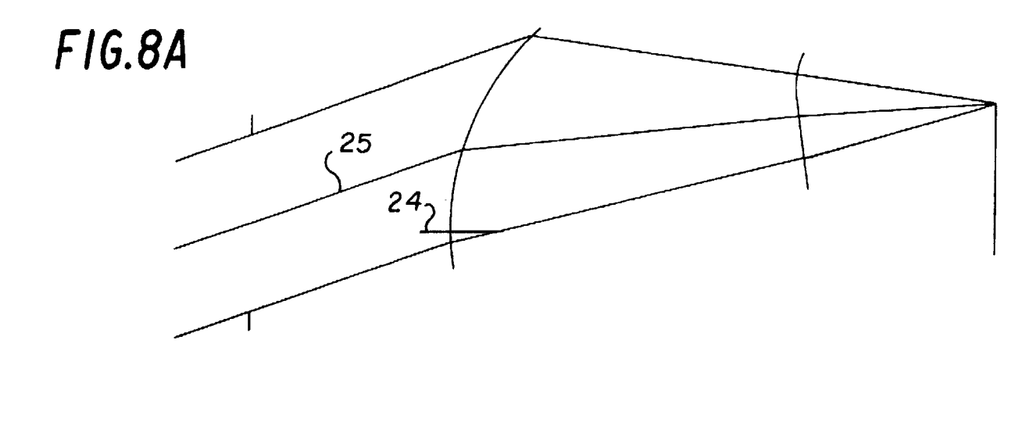
FIGS. 8A, 8B, and 8C, illustrate a cross section of, the portion of a lenslet associated with a 20 degree field angle, the associated tangential, and saggital ray aberration curves, respectively.
Figure 8B:
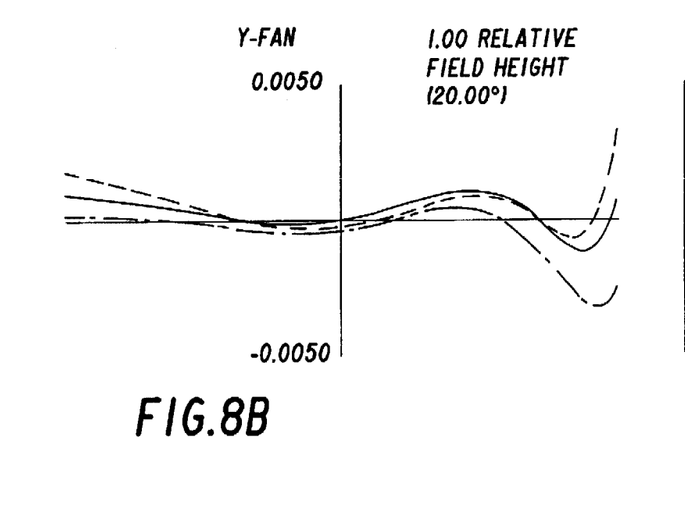
Figure 8C:
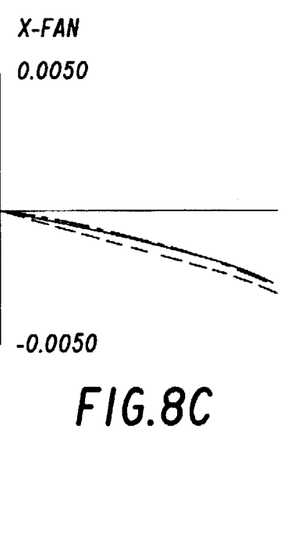

The diffractive lenslets 10 are shown in FIGS. 6A, 7A, and 8A, for the on-axis, 16 degrees, and full field of view. To be noted in a comparison of these figs is that the mechanical optical axis 24 is moving radially outwards as a function of field angle while the local optical axis 25 is incident normal to the plane of the photodetector array.

Figure 6B:
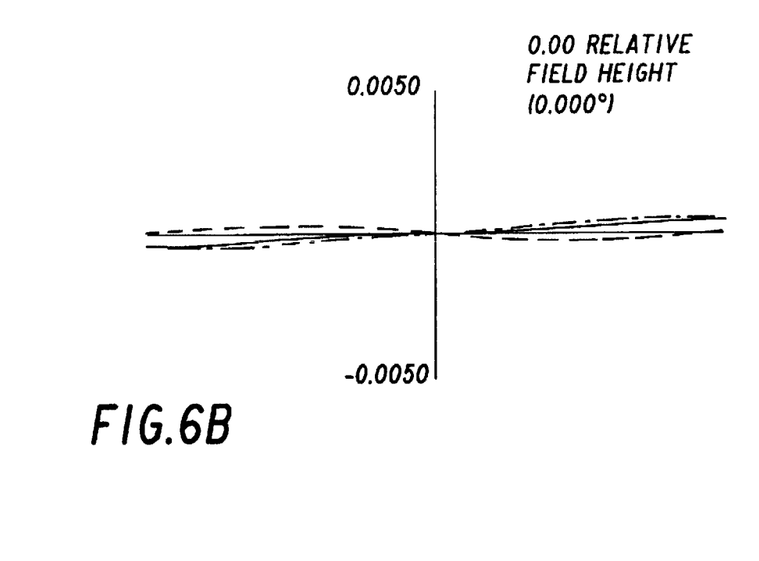
Figure 6C:
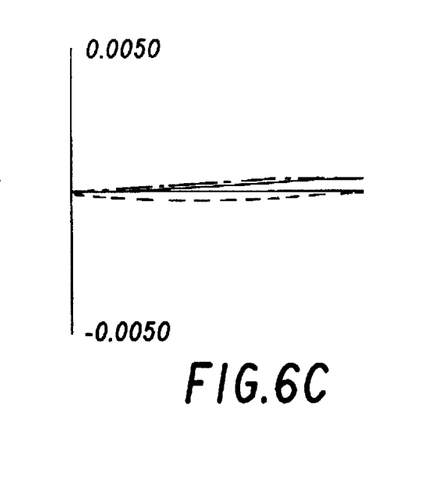

The opaque mask 16 acts as the aperture stop for the system as well as limiting the field of view of a given photosensor FIGS. 6B, 6C; 7B, 7C; and 8B, 8C represent the tangential and saggital ray aberration curves for their respective lenslets. It is noteworthy that the overall spot size, including chromatic aberration, is approximately 10 microns which is a typical photodetector size. The solid lines represent a wavelength of 546.1 nm, the dotted lines represent a wavelength of 656.1 nm, and the dotted and dashed lines represent a wavelength of 460.0 nm which represent light in the green, red, and blue, wavelengths.

The following table lists the optical design parameters for three array elements at 0, 16, and 26 degrees. The array elements at the intermediate field angles can be interpolated from these values.

EXAMPLE A

EFL=0.5 mm
F/#=2.0

| Surface No. | Radius | Thickness | Glass |
|---|---|---|---|
| Object | | Infinity | Air |
| 1 Aperture Stop | | 0.282 | Air |
| 2 | 0.38911 | 0.5 | BK7 |
| | Diffractive Coefficients | | DF1 = −6.861 × 10⁻² |
| | | | DF2 = 6.568 × 10⁻¹ |
| | | | DF3 = 3.453 × 10⁻³ |
| | | | DF4 = −1.435 × 10² |
| | | | DF5 = 1.398 × 10³ |
| 3 | −0.50499 | 0.25715 | Air |
| Aspheric Coefficients | AD = 0.18542 × 10² | | |
| | AE = −0.44635 × 10³ | | |
| | AF = 0.10191 × 10⁵ | | |
| | AG = −0.70929 × 10⁵ | | |
| | AH = 0.78203 × 10⁵ | | |
| Image | | | Air | where the aspheric surface profile is defined by $$z(r) = \frac{cv r^2}{1 + \sqrt{1-(k+1)cv^2 r^2}} + ADr^4 + AEr^6 + AFr^8 + AGr^{10}$$

and the diffractive phase profile is defined as $$\phi(r) = \frac{2\pi}{\lambda_0}(DF_1 r^2 + DF_2 r^4 + DF_3 r^6 + DF_4 r^8 + DF_5 r^{10})$$

where $\lambda_0 = 546.1$ nm

The invention has been described with reference to a preferred embodiment. However, it will be appreciated that variations and modifications can be effected by a person of ordinary skill in the art without departing from the scope of the invention.

PARTS LIST 10 lenslet
12 radius
14 radius
15 lines
16 radius
18 diffractive surface
20 refractive, spherical surface
22 second surface
24 mechanical optical axis
25 local optical axis
26 aperture steps
30 incident light rays
40 aperture stop array
42 field stop array
50 focal plane
60 lenslet array
70 image photosensor array
72 photosensitive sites
74 baffles

I claim:

1. An image sensor comprising:

a color photosensor array comprised of a number of sets of three photosensors with red, green, and blue, filters positioned over respective photosensors in each set;

a lenslet array having a number of lenslets equal to the number of three sets of photosensors in said color photosensor array, wherein each lenslet is formed with a first convex, spherical surface having diffractive means incorporated thereon and a second surface which is aspheric and opposite said first surface with the size of said lenslet array being greater than the size of said color photosensor array by an amount that allows the mechanical optical axis of each lenslet, at the largest field angle, to image incident light onto a set of three photosensors; and an array of aperture stops combined with an array of field stops wherein the number of field stops and the number of aperture stops are equal to the number of lenslets and wherein each field and aperture stop is aligned to the center of the mechanical optical axis of a lenslet.

2. The image sensor according to claim 1 wherein the second surface of each lenslet is an aspheric surface that is convex at the lenses physical center and transitions to a concave surface towards the edge of the lens.

3. The image sensor according to claim 1 wherein said array of aperture stops is positioned in front of said lenslet array.

4. The image sensor according to claim 1 wherein said array of aperture stops is positioned between said lenslet array and said color photosensor array.

5. The image sensor according to claim 1 wherein the lenslets of said array of lenslets are abutting.

6. The image sensor according to claim 1 wherein each lenslet is positioned in said array so as to view a different fraction of the total field of view of the image sensor.

7. The image sensor according to claim 1 and further comprising a plurality of baffles extending between each lenslet and a set of three photosensors for preventing stray light from an adjacent lenslet impinging on a neighboring set of three photosensors.

* * * * *